United States Patent
Laub-Maier

[11] Patent Number: 6,152,076
[45] Date of Patent: Nov. 28, 2000

[54] AUTOMATIC MILKING PROCESS AND DEVICE

[75] Inventor: Maria Laub-Maier, Tuerkheim, Germany

[73] Assignee: Jakob Maier, Tuerkheim, Germany

[21] Appl. No.: 09/171,186

[22] PCT Filed: Apr. 10, 1997

[86] PCT No.: PCT/EP97/01794

§ 371 Date: May 24, 1999

§ 102(e) Date: May 24, 1999

[87] PCT Pub. No.: WO97/37526

PCT Pub. Date: Oct. 16, 1997

[30] Foreign Application Priority Data

Apr. 11, 1996 [DE] Germany .......................... 196 14 376

[51] Int. Cl.[7] .................................................. A01J 5/04
[52] U.S. Cl. .................. 119/14.08; 119/14.2; 119/14.17; 119/14.44; 119/14.49; 119/14.55; 119/14.46; 119/14.36; 119/14.37
[58] Field of Search ................................. 119/14.2, 14.17, 119/14.08, 14.44, 14.49, 14.55, 14.46, 14.36, 14.37

[56] References Cited

U.S. PATENT DOCUMENTS

| | | |
|---|---|---|
| 3,756,198 | 9/1973 | Rudle ..................................... 119/14.37 |
| 3,759,226 | 9/1973 | Rudle et al. .......................... 119/14.36 |
| 3,783,837 | 1/1974 | Olander . |
| 4,280,446 | 7/1981 | Noorlander ........................... 119/14.49 |
| 4,516,530 | 5/1985 | Resisgies et al. ..................... 119/14.08 |
| 4,907,535 | 3/1990 | Matsuzaqa et al. .................. 119/14.55 |
| 5,052,341 | 10/1991 | Woolford et al. ..................... 119/14.02 |
| 5,090,359 | 2/1992 | Petteson et al. ...................... 119/14.44 |
| 5,218,924 | 6/1993 | Thompson et al. . |
| 5,720,236 | 2/1998 | Carrano et al. ....................... 119/14.46 |

FOREIGN PATENT DOCUMENTS

| | | |
|---|---|---|
| 2023680 | 8/1970 | France . |
| 31 36 841 | 3/1983 | Germany . |
| 36 24 478 | 1/1988 | Germany . |

*Primary Examiner*—Charles T. Jordan
*Assistant Examiner*—Daniel J. Beitey
*Attorney, Agent, or Firm*—Flynn, Thiel, Boutell & Tanis, P.C.

[57] ABSTRACT

In the case of a method and of a device for automatically extracting milk, long milk hoses having a large internal diameter are used, which permit an optimum mode of operation in combination with the highest possible flows of milk. In addition, the flow cross-section of the milk discharge system of the milking unit is controlled during the relief cycle at a predetermined point in dependence upon the pressure prevailing below the teat or in dependence upon the milk to be discharged. In this way, cows having different flows of milk can be milked in the best possible manner with the aid of only one kind of long milk hose.

19 Claims, 3 Drawing Sheets

AUTOMATIC MILKING PROCESS AND DEVICE

FIELD OF THE INVENTION

The present invention refers to a method and a device for automatically extracting milk with the aid of a milking unit, in the case of which milk is extracted from the teat in a suction cycle with the aid of the milking vacuum applied below the teat via a long milk hose, a collecting piece and a teat cup, and in the case of which the teat rubber of the teat cup clings softly to the teat for relieving the teat during a relief cycle.

BACKGROUND OF THE INVENTION

In conventional automatic milk extraction processes, a so-called nominal vacuum is applied to the milk discharge line which is fixedly installed in the stable and in the milking palor, respectively. This nominal milking vacuum is used for extracting milk from the teat on the one hand, and for discharging the extracted milk on the other. How high the vacuum actually is, which is effective below the teat at certain moments, depends on a plurality of factors, especially, however, on the cross-section of the long milk hose on the one hand and on the magnitude of the milk flow from a cow, which is extracted from the teat, on the other. Hence, long milk hoses adapted to the maximum cow milk flow to be expected should, in principle, be used for an optimum adjustment of the vacuum below the teat during the suction and relief cycles. In view of the fact that, in most cases, several cows are milked successively making use of the same milking unit, the inevitably resulting circumstances will not permit optimum milking. If long milk hoses having an insufficient interior cross-section, which may be the optimum milk hoses for a specific cow having a low flow of milk, are e.g. used, this may, on the one hand, have the effect that, for the next cow having a higher flow of milk, the milk discharge capacity is not sufficiently high so that an undesirable accumulation of milk occurs, and, on the other hand, it may have the effect that the milking vacuum below the teat becomes so low that the pressure relief of the teat will no longer be sufficient or that, in extreme cases, the teat cups will even fall off. If, however, long milk hoses having a very large interior cross-section, which would be optimally adapted to cows having a very high flow of milk, are used, the use of this milking unit for cows having a low flow of milk may have the effect that an excessively high vacuum occurs below the teat during the relief cycle and this would necessarily cause damage to the teat in the long run. In order to achieve the best possible adaptation, long milk hoses having at least nine different interior cross-sections are therefore available on the market, viz. hoses having interior diameters between 8 and 16 mm, the difference from one hose to the next being 1 mm.

Hence, it is the object of the present invention to improve this situation.

SUMMARY OF THE INVENTION

In the case of a method of the type mentioned above, this object is achieved in accordance with a first solution according to the present invention in that a long milk hose is used, which has a large interior cross-section permitting the discharge of high flows of milk, and that, during the relief cycle, the flow cross-section of the milk discharge system of the milking unit is controlled at a predetermined point in dependence upon the pressure prevailing below the teat. The control can also be effected in such a way that a desired value is predetermined for the negative pressure desired below the teat, and that the flow cross-section of the milk discharge system is controlled in such a way that the best possible adaptation to said desired value is achieved in accordance with a control operation.

Since the method starts from a long milk hose having an interior cross-section which would, in principle, be the optimum cross-section for high flows of milk, the vacuum at the teat will increase during the relief cycle in the case of lower flows of milk in comparison with this starting point. This can be counteracted by reducing the flow cross-section of the milk discharge system of the milking unit accordingly. In this way, the vacuum will decrease more strongly over the length of the milk discharge system, and this will have the effect that, below the teat, only a lower vacuum will become effective, which, in combination with the atmospheric pressure normally prevailing in the pulsator chamber of the teat cup during the relief cycle, minus the pressure required for collapsing, i.e. folding in the teat rubber, will then result in a negative pressure below the teat having the optimum magnitude for relieving the teat.

In accordance with a second solution according to the present invention, the above-mentioned object is achieved by the features that a milk hose is used, which has a large interior or cross-section permitting the discharge of high flows of milk, and that, during the relief cycle, the flow cross-section of the milk discharge system of the milking unit is controlled at a predetermined point in dependence upon the milk to be discharged. Since the long milk hose is, in principle, adapted to high flows of milk, the use of such a milk hose according to the present invention in the case of low flows of milk will result in a reduction of the flow cross-section, and this will, in turn, result in a higher reduction of the vacuum along the milk discharge system of the milking unit and, consequently, in a reduced negative pressure below the teat during the relief cycle.

For effecting a suitable control, especially a milk flow meter can be provided, e.g. in the long milk hose. In this case the flow cross-section of the milk discharge system is changed in dependence upon the flow of milk measured in this way. For carrying out the present invention, it is, however, not absolutely necessary to measure the flow of milk itself. Also the milk which is to be discharged from the collecting piece during the relief cycle can, for example, be used for this purpose. The maximum milk level in the collecting piece detected during the relief cycle can, for example, be used in this respect. A control can, however, also be carried out in such a way that the flow cross-section of the milk discharge system is controlled in accordance with the varying milk level in the collecting piece.

It follows that the present invention offers the essential advantage that cows having extremely different flows of milk can be milked in the best possible manner with the aid of a long milk hose having only one interior cross-section. Since for the hitherto known maximum flows of milk of approx. 12 to 13 l/min, a milking hose having an interior diameter of 16 to 18 mm would be most advantageous, it would suffice to use long milk hoses of this type, i.e. the production and also the stockkeeping of milk hoses with hitherto different diameters would become much more simple. In addition, the present invention can definitely also be used in an advantageous manner without making use of milk hoses which are suitable for the absolutely highest flow of milk. If it is, for example, known that the highest flow of milk to be expected in a herd of cows to be milked is only 1 to 12 l/min, a long milk hose having a diameter of approx. 11 mm can, of course, be used, since an adaptation to lower flows of milk will then take place automatically in accordance with the present invention.

Taking as a basis a device for automatically extracting milk, comprising a milking unit, which is composed of a long milk hose, a collecting piece and at least one teat cup and with the aid of which a milking vacuum can be applied to the teat, and a device for changing over the teat cup between a suction phase in which milk is extracted from the teat and a relief phase in which the teat rubber of the teat cup clings softly to the teat for relieving the teat, the posed task is solved according to the present invention by the features that a long milk hose is provided, which has a large interior cross-section permitting the discharge of high flows of milk, that a means is provided for varying the flow cross-section of the milk discharge system of the milking unit at a predetermined point, and that a means is provided for varying the flow cross-section in dependence upon the negative pressure applied below the teat during the relief cycle.

Preferably, the means for varying the flow cross-section is directly connected to the milk discharge tube below the teat or the collecting piece for its control. In this way, direct control can be effected on the basis of the varying negative pressure below the teat.

According to a further embodiment, a pressure metering device is provided, which is connected to the interior of the milk discharge line in the area below the teat and to the collecting piece and which actuates, according to the pressure measured, the means for varying the flow cross-section. The actuation can then be carried out by an electric as well as by a pneumatic actuating device.

Taking as a basis a device of the type mentioned at the beginning, the task is solved in accordance with a second solution of the present invention by the features that a long milk hose is provided, which has a large interior cross-section permitting the discharge of high flows of milk, that a means is provided for varying the flow cross-section of the milk discharge system of the milking unit at a predetermined point, and that a means is provided for varying the flow cross-section in dependence upon the milk to be discharged.

According to a preferred embodiment, the means for varying the flow cross-section is provided with a float, which is arranged in the interior of the collecting piece and which, in dependence upon its floating level, varies the flow cross-section of the discharge line of the collecting piece or of the inlet pieces leading into the collecting piece. This results in an extremely simple control merely in dependence upon the level of the milk which is contained in the collecting piece and which is to be discharged.

According to another embodiment, the milk discharge system has provided therein a milk flow meter which, in dependence upon the flow of milk measured, applies an actuating signal to the means for varying the flow cross-section.

The means for varying the flow cross-section can consist e.g. of a pneumatically operable annular collar, or of a pneumatically or electrically operable iris diaphragm, or e.g. of a pneumatically or electrically operable valve diaphragm.

BRIEF DESCRIPTION OF THE DRAWINGS

In the following, the present invention will be explained in detail on the basis of embodiments shown in the drawing, in which.

DETAILED DESCRIPTION

Figure 1:
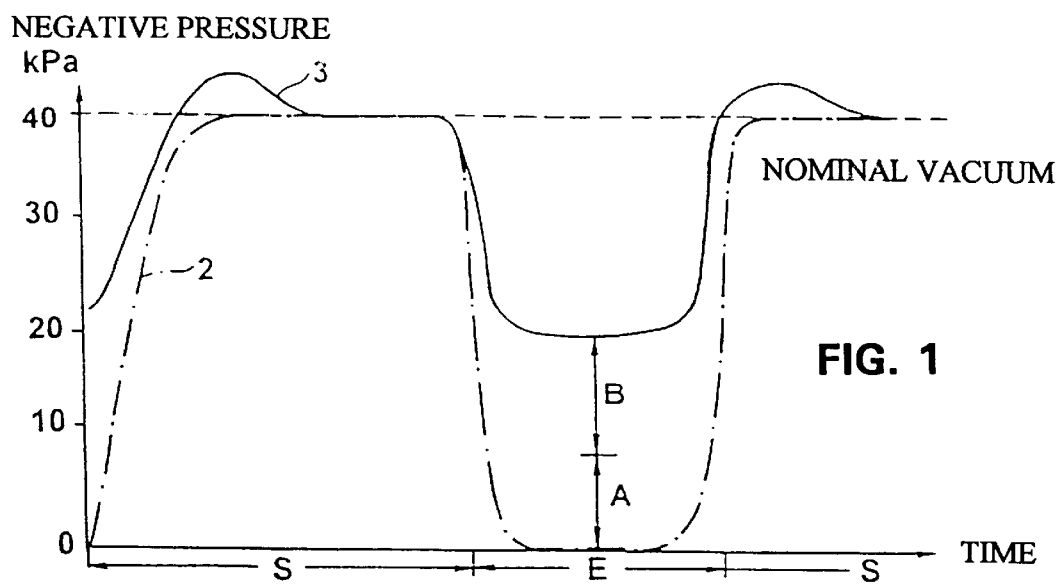
FIG. 1 shows a representation of the milking vacuum development below the teat as well as the vacuum development with time in the pulsator chamber of the teat cup for an optimum negative pressure below the teat during the relief cycle.

FIG. 1 shows a coordinate system in which the negative pressure is plotted along the ordinate in kPa, whereas the abscissa represents the time axis. The time periods S stand for the suction cycle and the time periods E for the relief cycle. The curve 2 (represented by a dot-and-dash line) indicates the development of the vacuum in the pulsator chamber of the teat cup. The pulsator chamber is defined by the space located between the inner surface of the teat cup sleeve and the outer surface of the teat rubber hose. During the suction cycle, the negative pressure in the pulsator chamber increases until it has virtually reached the nominal vacuum of approx. 40 kPa, whereby the teat rubber hose will be extended to its full cross-section and the milking vacuum below the teat can fully be used for extracting the milk from the teat. During the relief cycle E, the vacuum in the pulsator chamber decreases to virtually zero, since, during this phase, atmospheric pressure is admitted to the pulsator chamber. Subsequently, during the next suction cycle, the vacuum in the pulsator chamber will increase up to the nominal vacuum again.

The development of the vacuum below the teat is shown by curve 3 (represented by a solid line). During the suction cycle the vacuum first increases beyond the nominal vacuum; this is due to the fact that a suction effect is produced duet to the sudden expansion of the teat rubber hose. The vacuum below the teat then assumes a value corresponding approximately to that of the nominal vacuum. During the relief cycle, the vacuum below the teat decreases, but it decreases less than the pressure in the pulsator chamber. In the embodiment shown, the vacuum below the teat only decreases to a value of approx. 20 kPa after a negative pressure of 40 kPa during the suction cycle. The reduction of the vacuum below the teat during the relief cycle is based on the process conditioned by the milk discharge. Since the pressure prevailing in the interior of the teat rubber hose is, in the relief phase, lower than that prevailing on the outer side of said hose in the pulsator chamber, the hose collapses and this has the effect that it clings softly to the teat and that it virtually closes below the teat due to abutting hose walls. The pressure difference is indicated by the sum of pressure A and pressure B. Pressure A of this total pressure difference is, however, required for causing the teat rubber to fold in. This pressure is the so-called fold-in pressure of the teat rubber. In the present case, this fold-in pressure amounts to approx. 8 kPa. The rest of the pressure difference B acts as pressure on the teat and serves to relieve the teat during the relief cycle. In the present case, the relief pressure B is approx. 12 kPa. This is a pressure which relieves the teat to a sufficient extent and which evokes a pleasant sensation on the part of the cow. The pressure acting on the teat during the relief cycle should approximately be in the range between 10 and 20 kPa. Upon determining this pressure, the respective fold-in pressure of the teat rubber should be taken into account, as has already been stated hereinbefore. Depending on the teat rubber used, this fold-in pressure can be between approx. 5 kPa and 18 kPa.

Figure 2:
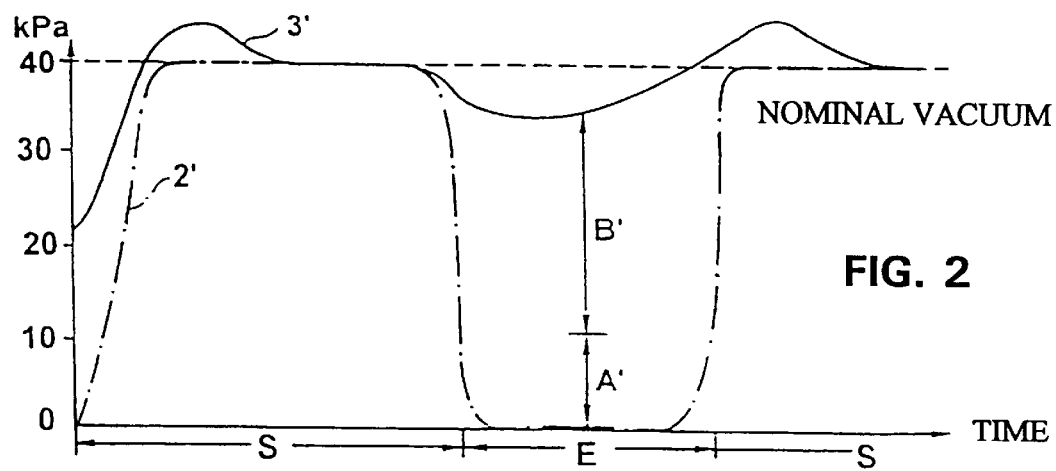
FIG. 2 shows a representation which is similar to that of FIG. 1 and in which the vacuum below the teat is excessively high in the relief cycle.

The representation shown in FIG. 2 is similar to that shown in FIG. 1. The characteristic of the curve 3' of the vacuum below the teat differs from the representation in FIG. 1 insofar as, in the relief cycle, the curve 3' does not show any substantial decrease of the vacuum below the teat in comparison with the nominal vacuum. The difference only amounts to approx. 5 kPa, i.e. the vacuum decreases from 40 kPa to approx. 35 kPa. Since the development of the pressure in the pulsator chamber does not change, this results in a substantially larger pressure difference between the pressure in the interior of the pulsator chamber and the pressure below the teat. This pressure corresponds to the sum of pressure A' and pressure B'. Assuming that a teat rubber having a fold-in pressure of approx. 8 kPa has been used again, it turns out that the pressure B' acting on the teat is approx. 27 kPa. The cow finds this pressure unpleasant and stressful, whereby the total yield of milk will be reduced. In addition, it turned out that, when the pressure acting on the teat during the relief cycle is as high as the above-mentioned one, the teat undergoes a change, i.e. it turns out that the teat is turned inside out and undergoes a permanent change. This contributes to an increased bacterial invasion and, consequently, to mastitic diseases of the cow.

The characteristic 3' of the curve shown in FIG. 2 is obtained in cases where e.g. long milk hoses having a comparatively large internal cross-section are used for a cow with a low flow of milk.

Figure 3:
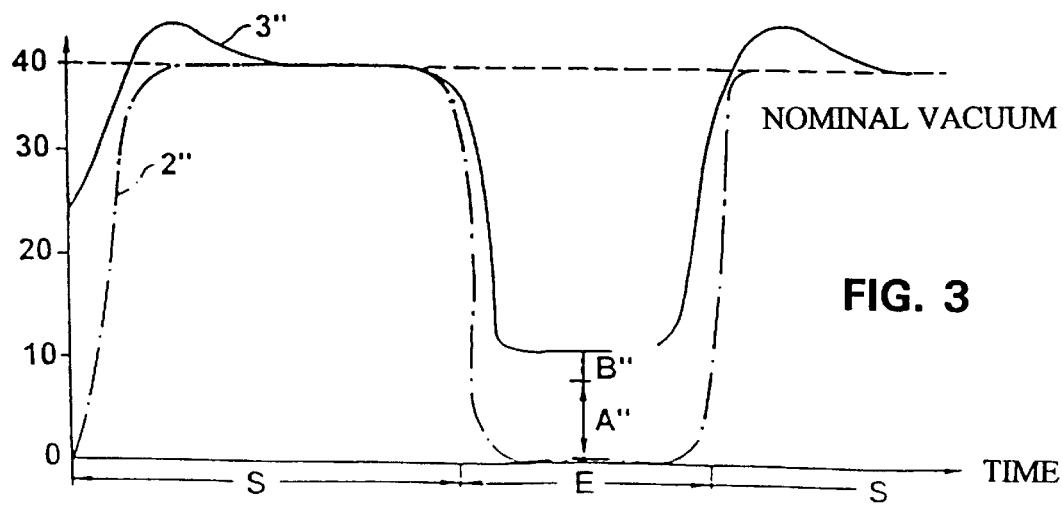
FIG. 3 shows a representation which is similar to that of FIG. 1, the vacuum below the teat being, however, reduced to an excessive extent.

FIG. 3 shows a curve characteristic in the case of which the curve representative of the pressure below the teat shows a comparatively strong decrease of the vacuum down to approx. 10 kPa in the relief cycle. Assuming that the fold-in pressure A" of the teat rubber corresponds to that of the preceding examples, i.e. assuming a fold-in pressure of approx. 8 kPa, this will have the effect that the pressure B" acting on the teat in the relief cycle amounts to only 2 kPa. This pressure is considered to be too low for effectively relieving the teat during the relief cycle. Such low pressures may, in addition, also have the effect that the teat cup falls off the teat completely. A curve characteristic of the type shown in FIG. 3 is obtained in cases where a long milk hose is used whose internal cross-section is, in principle, intended for smaller flows of milk. When such a milk hose is used for a cow having comparatively high flows of milk, the excessive decrease of the vacuum shown in FIG. 3 will occur.

The concept of the present invention is now based on the suggestion that, independently of the cow to be milked, a milking unit should be used that makes use of a long milk hose having an interior diameter which would, in principle, only be optimal for cows having the highest existing flow of milk. If such a milking unit were also used for cows having a lower flow of milk, this would inevitably damage the teats permanently. Hence, practical precautionary measures are taken according to the present invention insofar as the pressure acting on the teat in the relief cycle lies in a range of from approx. 10 to 20 kPa. This can be achieved in that the pressure is measured directly below the teat in the relief cycle; "directly below the teat" includes also the area which also comprises the pressure in the collecting piece. Using the pressure below the teat for the purpose of control, it is then possible that, on the basis of the nominal vacuum, which decreases along the milk discharge system, i.e. from the teat cup via the collecting piece and the long milk hose up to the milk discharge line, the vacuum is purposefully controlled in such a way that the vacuum which is actually effective below the teat is in a predetermined range.

A means with the aid of which the vacuum below the teat can be controlled, starting from the constant nominal milking vacuum, consists of the means shown in FIG. 4. In the case of this means, an area is formed in the milking hose 10, said area being formed by an annular collar 11 consisting of a tubular easily compressible material. The control of the cross-section C, which can be obtained by this annular collar 11, can be effected by controlling the pressure in an annular chamber 12 which surrounds this collar and in the interior of which a respective vacuum or, if necessary, an excess pressure can be produced via the supply line 13. Depending on the pressure difference between the pressure in the interior of the long milk hose 10 and the pressure in the interior of the chamber 12, the annular collar will then takes up a suitable position defining a suitable cross-section.

Figure 4:
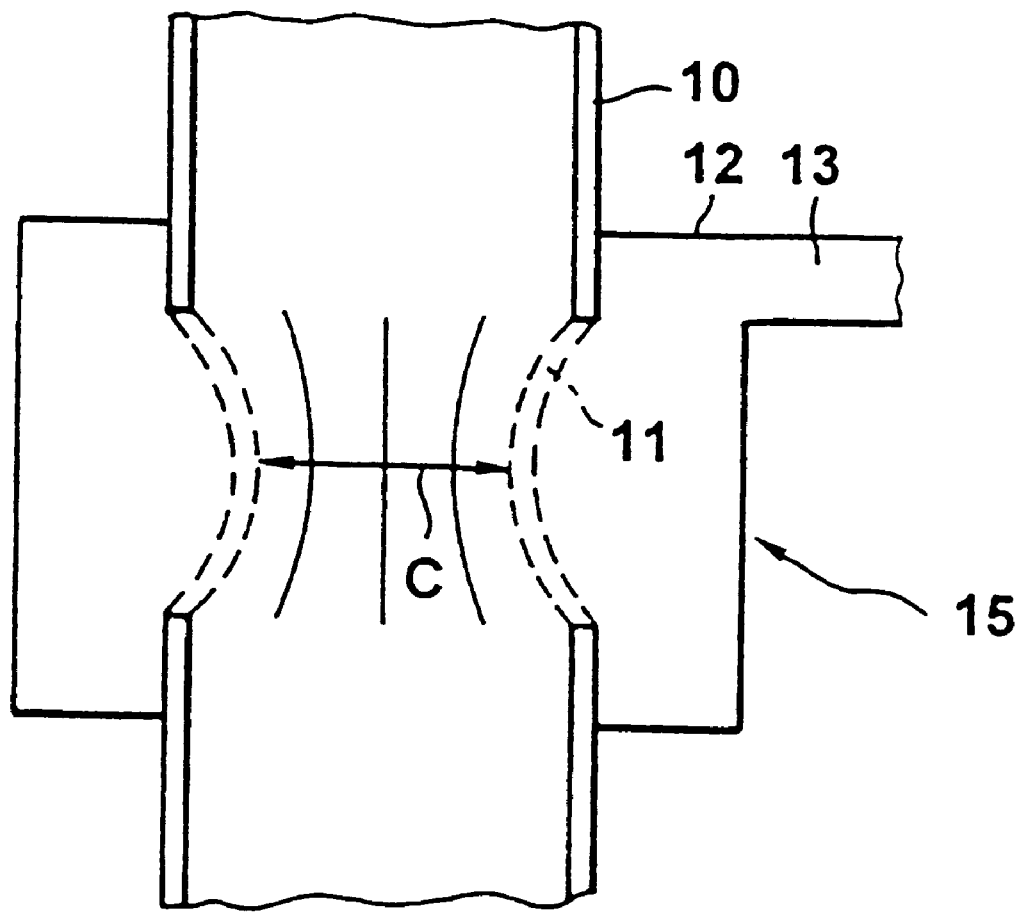
FIG. 4 shows a schematic representation of an embodiment of a means for varying the flow cross-section of the milk discharge system.
Figure 5:
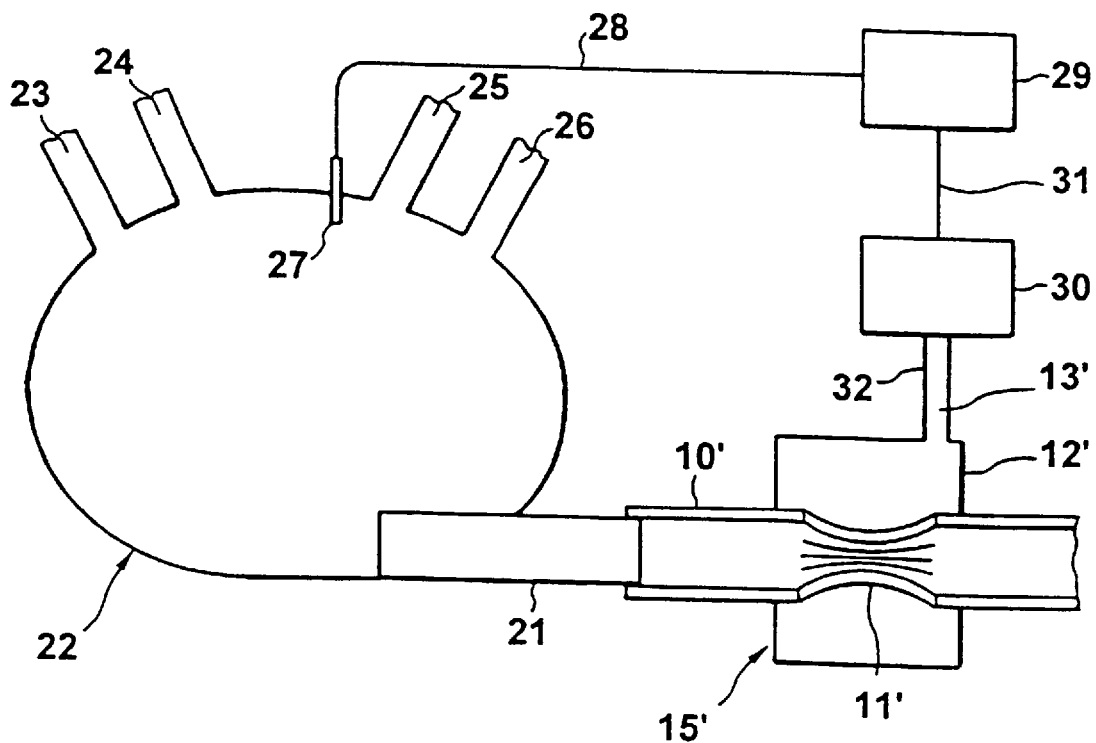
FIG. 5 shows a schematic representation in which the means shown in FIG. 4 is inserted into the long milk hose downstream of the collecting piece.

FIG. 5 shows an application of the control means 15 according to FIG. 4, which is designated by reference numeral 15' in FIG. 5. Identical parts are designated in FIG. 5 by identical reference numerals, which are, however, provided with a prime. The control means 15' is installed subsequent to the discharge tube 21 of a collecting piece 22, said control means 15' being installed in the long milk hose 10' following said discharge tube 21. The collecting piece 22 is only shown schematically, the four supply lines 23 to 26 of the four teat cups being shown schematically. A pressure sensor 27 projects into the interior of the collecting piece, said pressure sensor 27 being connected to a pressure metering unit 29 via a line 28. Via the line 31, the pressure metering unit 29 supplies electric signals corresponding to the measured pressure to the means 30, which, in response to the signals received, changes the negative pressure or the excess pressure in the annular chamber 12' via the line 32.

Figure 6:
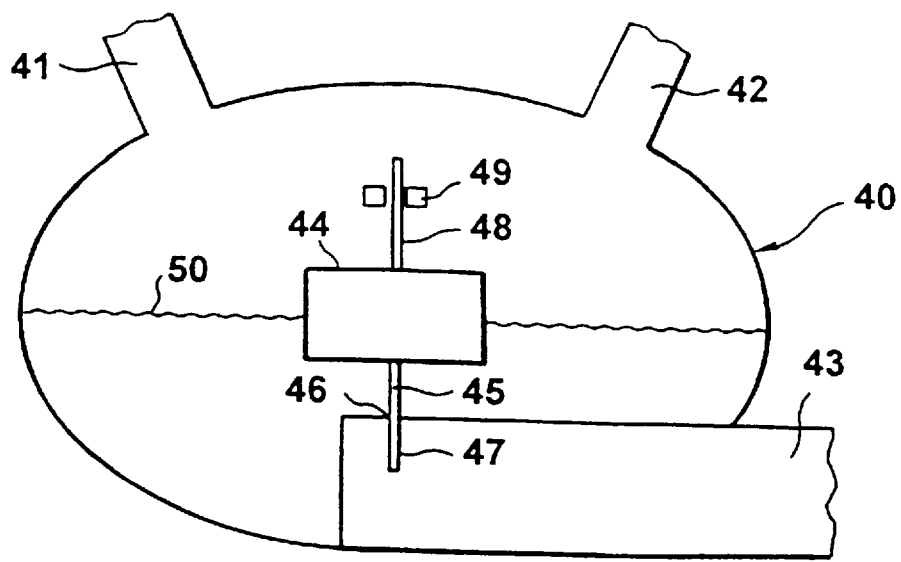
FIG. 6 shows a schematic representation of another embodiment of a means for varying the flow cross-section.

In FIG. 6, a collecting piece, designated generally by reference numeral 40, is shown. For reasons of clarity, the collecting piece is only provided with two inlet pieces 41, 42 connected to respective teat cups. On its lower end, the collecting piece is provided with a substantially horizontally extending discharge means 43. The collecting piece has arranged therein a float 44 which is provided with a control slide member 45 on the lower surface thereof, said control slide member 45 projecting with its lower part 47 into the discharge tube 43 via a slot 46 provided in the upper surface of said discharge tube 43. On the upper surface of said float 44, a guide rod 48 is provided, which is guided in a ring 49 secured to the inner side of the collecting piece. The float is guided in a vertically displaceable manner via the slide member 45 and the guide rod 48. The position of the float 44 depends on the level 50 of the liquid contained in the collecting piece. At a lower position of the float, at which the lower side of the float practically rests on the upper side of the discharge tube 43, the slide member 45 of the float can project into said tube to such an extent that it closes almost the whole cross-section. On the other hand, the float is guided in the ring 49 in such a way that, when the liquid level 50 rises above a certain level, the upper side of said float will abut on the lower side of the ring 49. At this position, the slide member 45 is fully withdrawn from the discharge tube 43.

The arrangement shown in FIG. 6 operates such that, depending on the liquid level 50, the slide member 45 projects into the discharge tube 43 to a greater or lesser extent. If the collecting piece 40 contains a small amout of milk that is to be discharged in the relief cycle, the control slide member 45 will project into the tube 43, whereas in the case of an increasing milk level 50 in the collecting piece 40, which corresponds to an increase in the flow of milk, it will be withdrawn progressively from the discharge tube 43.

What is claimed is:

1. A method of automatically extracting milk with a milking unit, comprising the steps of:
    mounting a teat cup on a teat;
    fluidly connecting a collecting piece to the teat cup;
    fluidly connecting a milk hose having an interior cross-section permitting high flows of milk between the collecting piece and a milk discharge system;
    applying a vacuum below a teat during a suction phase of the milking cycle through the milk hose to extract milk;
    continuously controlling a flow cross-section of the milk discharge system during a relief phase of the milking cycle at a predetermined point dependent on the pressure below the teat so that the teat is relieved and the teat cup remains mounted on the teat.

2. The method according to claim 1, wherein the step of mounting the teat cup includes receiving the teat in the teat rubber, which is enclosed by a sleeve to define a pulsator chamber therebetween, and the step of applying a vacuum includes the step of continuously applying a vacuum during the suction and relief cycles to hold the teat cup on the teat.

3. The method according to claim 2, wherein the step of mounting the teat cup includes applying a vacuum to the pulsating chamber during the suction period and applying generally atmospheric pressure to the pulsating chamber during the relief period.

4. A method of automatically extracting milk with the aid of a milking unit, comprising the steps of:
    mounting a teat cup on a teat;
    fluidly connecting a milk collector to the teat cup;
    fluidly connecting a milk hose to the milk collector;
    applying a negative pressure through the milk hose and milk collector to the teat cup, said applying step including extracting milk from the teat during a suction phase by applying a stronger negative pressure and clinging the teat cup to the teat during a relief phase by applying weaker negative pressure; and
    during the relief phase, continuously controlling a flow cross-section of the milk hose at a predetermined point dependent on the milk to be discharged through the milk hose.

5. The method according to claim 4, wherein the step of continuously controlling includes incrementally sizing the flow cross-section of the milk hose through a continuous spectrum of open flow cross-sections.

6. A device for automatically extracting milk, comprising:
    a milking unit including milk hose connected to a negative pressure source, a milk collector fluidly connected to said milk hose, and at least one teat cup fluidly connected to said milk collector for applying a milking negative pressure to a teat, said milk hose having an interior cross-section for discharging high flows of milk;
    a device for changing said teat cup between a suction phase in which milk is extracted from the teat and a relief phase in which the teat rubber of the teat cup clings softly to the teat while relieving the teat; and
    means for continuously varying the flow cross-section of said milk hose at a predetermined point dependent on the negative pressure applied below the teat during the relief cycle.

7. A device according to claim 6, characterized in that the means for varying the flow cross-section is directly connected to said milk hose below the teat or the milk collector.

8. A device for automatically extracting milk, comprising:
    a milking unit including a teat cup, a milk flow line fluidly connected to said teat cup, and a collecting piece receiving milk from said milk flow line;
    a device for changing said teat cup between a suction phase extracting milk from a teat and a relief phase, in said relief phase said teat cup clings softly to a teat;
    a milk discharge system including a negative pressure producing device and a milk hose fluidly connected between said negative pressure producing device and said milk collecting piece, said milk hose having an interior cross-section permitting the discharge of high milk flows; and
    a pneumatically operable annular collar in the milk discharge system for varying the interior cross-section of said milk hose at a predetermined point dependent on pressure below the teat during said relief cycle.

9. The device according to claim 8, wherein said collar surrounds said milk hose at said predetermined point and squeezes said milk hose to reduce said interior cross-section thereof.

10. A device for automatically extracting milk, comprising:
    a milking unit including a teat cup, a milk flow line fluidly connected to said teat cup, and a collecting piece receiving milk from said milk flow line;
    a device for changing said teat cup between a suction phase extracting milk from a teat and a relief phase, in said relief phase said teat cup clings softly to a teat;
    a milk discharge system including a negative pressure producing device and a milk hose fluidly connected between said negative pressure producing device and said milk collecting piece, said milk hose having an interior cross-section permitting the discharge of high milk flows; and
    a pneumatically or electrically operable iris diaphragm in the milk discharge system for varying the interior cross-section of said milk hose at a predetermined point dependent on pressure below the teat during said relief cycle.

11. The device according to claim 10, wherein said iris diaphragm is positioned at said predetermined point of said milk hose and reduces said interior cross-section of said milk hose in response to pressure in the milking device below said teat cup.

12. A device according to claim 6, wherein said means for varying the flow cross-section includes a pneumatically or electrically operable valve diaphragm, said flow cross-section always has a portion thereof open during said relief phase so that negative pressure is supplied to said milk collector and said teat cup.

13. The device according to claim 6, wherein said means for continuously varying includes means for incrementally sizing but not closing the flow cross-section of said milk hose so that negative pressure is continuously supplied to the teat through said milk collector and said teat cup.

14. The device according to claim 6, wherein said milk hose has a maximum said flow cross-section of 16 mm to 18 mm in diameter.

15. The device according to claim 14, wherein said milk hose has a reduced said flow cross-section of about 11 mm in diameter.

16. A device for automatically extracting milk, comprising:

a milking unit including a teat cup, a milk flow line fluidly connected to said teat cup, a collecting piece receiving milk from said milk line, and a milk hose fluidly connected to said collecting piece, said milk hose having an interior flow cross-section permitting high flows of milk therethrough;

a device for changing said teat cup between a suction phase extracting milk from a teat and a relief phase, in said relief phase said teat cup clings softly to a teat;

means for varying the flow cross-section of said milk hose at a predetermined point; and a pressure detector connected downstream of said teat cup to the interior of one of said milk discharge line and said collecting piece to measure pressure downstream of said teat cup, said pressure detector actuates, according to the pressure measured, the means for varying the flow cross-section.

17. A device for automatically extracting milk, comprising:

a milking unit including a milk discharge system, a collecting piece fluidly connected to said milk discharge system and at least one teat cup fluidly connected to said collecting piece, said milk discharge system having an open interior cross-section permitting the discharge of high flows of milk, said milking unit applying a milking vacuum to a teat, a device for changing over the teat cup between a suction phase in which milk is extracted from the teat and a relief phase in which a teat rubber of the teat cup clings softly to the teat for relieving the teat, and means for continuously varying the open flow cross-section of the milk discharge system at a predetermined point through a continuous spectrum of open flow cross-sections dependent on the milk to be discharged.

18. A device according to claim 17, wherein the means for varying the flow cross-section includes a float positioned in the interior of the collecting piece, said float being at a floating level depending on the amount of milk in said collecting piece and varying the flow cross-section of one of a discharge line of the collecting piece and inlet pieces leading into the collecting piece.

19. A device according to claim 17, wherein the milk discharge system has a milk flow meter therein, said milk flow meter dependent on the flow of milk measured, applies an actuating signal to the means for varying the flow cross-section.

\* \* \* \* \*